United States Patent
Jones et al.

(10) Patent No.: US 9,734,856 B2
(45) Date of Patent: Aug. 15, 2017

(54) APPARATUSES AND METHODS FOR ABSORBING OPTICAL ENERGY

(71) Applicant: Seagate Technology LLC, Cupertino, CA (US)

(72) Inventors: Paul M. Jones, Fremont, CA (US); Timothy J. Klemmer, Fremont, CA (US); Ruoxi Yang, Fremont, CA (US); Martin Giles Blaber, Fremont, CA (US); Xiaoding Ma, Fremont, CA (US); ZhaoHui Z. Fan, Fremont, CA (US); Michael J. Stirniman, Fremont, CA (US); Yang Yang, Fremont, CA (US); XiaoPing Yan, Fremont, CA (US); Fujian Huang, Fremont, CA (US); Emil John C. Esmenda, Fremont, CA (US); Emir R. Kazazic, Fremont, CA (US); Florin Zavaliche, Fremont, CA (US); Hongbo Wang, Fremont, CA (US); Huan H. Tang, Fremont, CA (US); Kyoumarss Damavandi, Fremont, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/199,668

(22) Filed: Jun. 30, 2016

(65) Prior Publication Data
US 2017/0025139 A1    Jan. 26, 2017

Related U.S. Application Data

(60) Provisional application No. 62/196,255, filed on Jul. 23, 2015.

(51) Int. Cl.
| | | |
|---|---|---|
| *G11B 5/82* | (2006.01) | |
| *G11B 11/00* | (2006.01) | |
| *G11B 5/66* | (2006.01) | |
| *G11B 5/72* | (2006.01) | |
| *G11B 5/00* | (2006.01) | |
| *G11B 5/012* | (2006.01) | |

(52) U.S. Cl.
CPC ............ *G11B 5/72* (2013.01); *G11B 5/012* (2013.01); *G11B 2005/0021* (2013.01)

(58) Field of Classification Search
CPC ..... G11B 7/2433; G11B 7/2437; G11B 7/135; G11B 2002/24312; G11B 5/82; G11B 5/743; G11B 5/855; G11B 11/10506; G11B 11/10586; G11B 5/7325; G11B 5/732; G11B 5/66; G11B 5/656
USPC .......... 360/97.01, 135, 244; 369/13.5, 272.1, 369/275.1, 275.2, 283; 428/829, 831
See application file for complete search history.

(56) References Cited

U.S. PATENT DOCUMENTS

2016/0118077 A1*   4/2016   Lunt ................... G11B 7/2433
720/746

OTHER PUBLICATIONS

Niklasson et al, "Thermochromic vanadium oxide thin films; Electronic and optical properties", Published in 2014, pp. 1-8.*

* cited by examiner

*Primary Examiner* — Nabil Hindi

(57) ABSTRACT

Provided herein is an apparatus including a substrate and a magnetic recording layer over the substrate. In addition, a thermochromic layer is over the substrate, wherein the thermochromic layer includes a first optical absorbance at a first temperature and a second optical absorbance at a second temperature.

19 Claims, 6 Drawing Sheets

APPARATUSES AND METHODS FOR ABSORBING OPTICAL ENERGY

CROSS-REFERENCE TO RELATED APPLICATIONS

This application claims the benefit of U.S. Provisional Patent Application Ser. No. 62/196,255 filed Jul. 23, 2015, entitled "APPARATUSES AND METHODS FOR ABSORBING OPTICAL ENERGY".

BACKGROUND

Heat-assisted magnetic-recording ("HAMR") media absorbs incoming light energy during write operations. The light energy may be absorbed by one or more layers, for example including the topmost overcoat layer and/or the recording layer. Absorption of the light energy creates a temporal Gaussian thermal spot on the media. The magnitude of an applied optical power and a cross-track width of the spot used during the write operations are a function of the material composition of the media layers. For example, overcoat materials that absorb a significant amount of the light energy leave a smaller magnitude of energy for write operations.

SUMMARY

Provided herein is an apparatus including a substrate and a magnetic recording layer over the substrate. In addition, a thermochromic layer is disposed over the substrate, wherein the thermochromic layer includes a first optical absorbance at a first temperature and a second optical absorbance at a second temperature. These and other features and advantages will be apparent from a reading of the following detailed description.

DESCRIPTION

Figure 1:
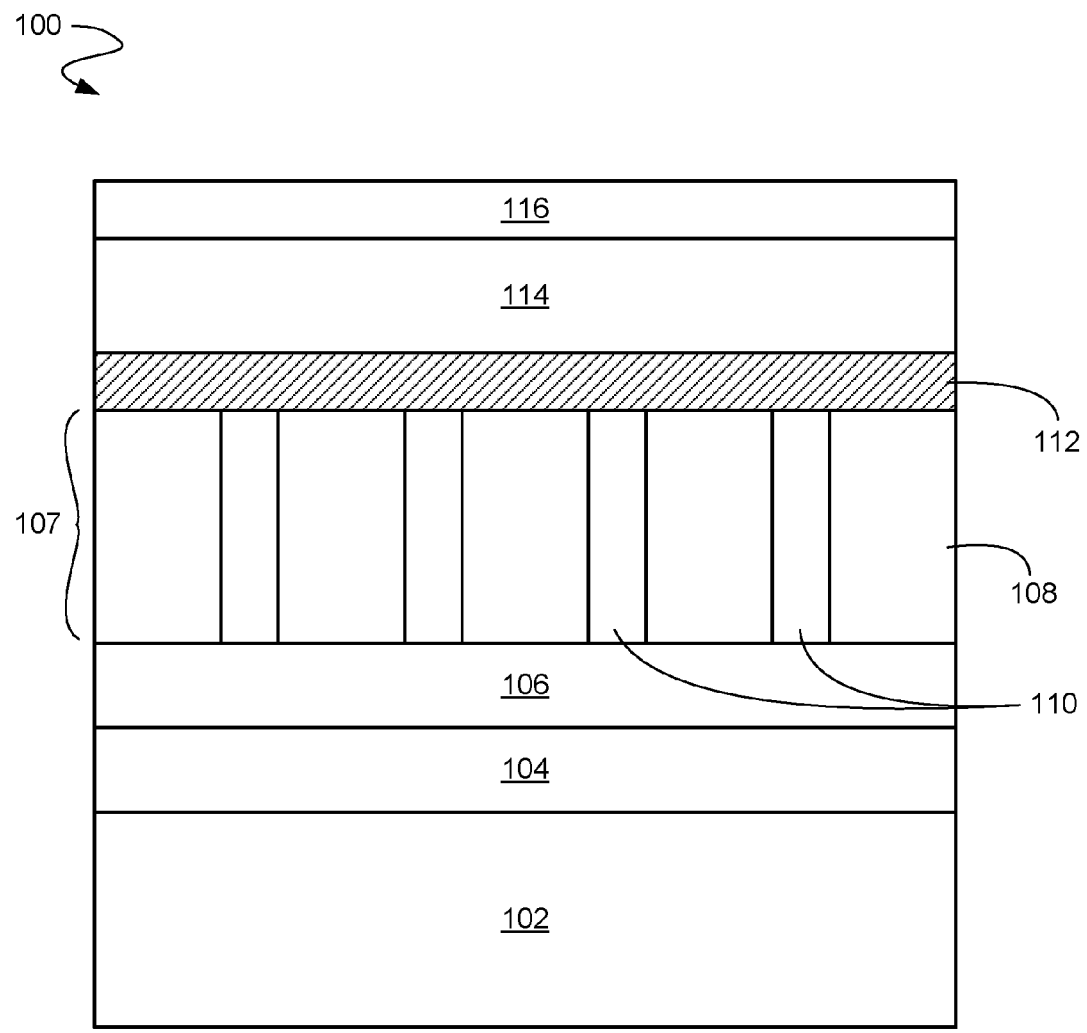
FIG. 1 illustrates a HAMR media stack including a thermochromic layer positioned above a granular magnetic recording layer according to one aspect of the present embodiments.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "middle," "bottom," "beside," "forward," "reverse," "overlying," "underlying," "up," "down," or other similar terms such as "upper," "lower," "above," "below," "under," ""between," "over," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Heat-assisted magnetic-recording ("HAMR") media absorbs incoming light energy into several layers during write operations. Absorption of the light energy creates a temporal Gaussian thermal spot in the media. The magnitude of an applied optical power and a width of the spot are a function of the material composition of the media layers. Thus, for example, an overcoat layer may include materials that absorb a significant amount of the light energy. As a result, a smaller amount of light energy is used for recording functions (e.g. switching magnetizations) in the media, thereby saving power. However, the thermal spot created in such media may spread quickly, resulting in a deleterious thermal bloom. Such a thermal bloom may quickly grow, spreading heat into undesired areas of the media and resulting in decreased signal-to-noise ("SNR") ratio and recording problems.

As a result of the foregoing, embodiments described herein use a thermochromic material deposited within the media layers. The thermochromic material has a relatively low optical heat absorbance and low thermal conductivity at room temperature, thereby acting as an insulator. However when heated, the thermochromic material switches to a relatively high optical heat absorbance within a thermal spot, thereby acting as a conductor. Although the thermal spot has a high optical heat absorbance, a low (e.g. room temperature) thermal conductivity is maintained outside of the thermal spot.

Referring now to FIG. 1, a HAMR media stack 100 including a thermochromic layer above a granular magnetic recording layer is shown according to one aspect of the present embodiments. A substrate 102 is provided. In various embodiments, the substrate 102 may be disc shaped and may include a non-magnetic metal, alloy, or non-metal. For example, the substrate 102 may comprise aluminum, an aluminum alloy, glass, ceramic, glass-ceramic, polymeric material, a laminate composite, or any other suitable non-magnetic material.

Overlying the substrate 102 are one or more layers of a layer stack 104. The layer stack 104 may include, for example, a soft magnetic underlayer ("SUL"). For example, the SUL 104 may be a 10 to 2000 Å thick layer including a soft magnetic material such as Ni, NiFe, Co, CoZr, CoZrCr, CoZrNb, CoCrTaB, CoCrB, CoCrTa, CoFe, Fe, FeN, FeSiAl, FeSiAlN, FeCoC, etc. In some embodiments, the SUL may include multiple layers, and the multiple SUL layers may be separated by one or more layers (e.g. Ru layers). In addition, the layer stack 104 may include one or more seed layers and intermediate layers to promote growth and fix orientations (e.g. face-centered cubic ("fcc") structure in (111) orientation, hexagonal close-packed ("hcp") structure in (0002) orientation, or others). It is understood that the above are non-limiting examples of layers in the layer stack 104. The layer stack 104 may include any number or combinations of layers used in magnetic recording media.

Also overlying the substrate 102 may be a heat sink layer 106. In the illustrated embodiment, the heat sink layer 106 also overlies the layer stack 104 and is under a recording layer 107. However, it is understood that one or more heat sink layers may be positioned anywhere within the HAMR media stack 100, including within the recording layer 107. In various non-limiting embodiments, the thickness of the heat sink layer 106 may be, for example, 5 to 50 nm. In addition, the heat sink layer 106 may include one or more materials having high thermal conductivity to dissipate heat (e.g. Cu, Ag, Al, Au, CuZr, etc.).

Overlying the heat sink layer 106 is the recording layer 107, which may also be referred to as a magnetic recording layer. The recording layer 107 includes granular columns 108 for magnetically storing information. The granular columns 108 may include one or more magnetic and non-magnetic layers (not shown) that are stacked together for magnetically storing information. For example, the granular columns 108 may include various magnetic layers that are ferromagnetically and/or antiferromagnetically coupled together, and which may be separated by one or more non-magnetic layers. The granular columns 108 are separated by non-magnetic spacers 110. The non-magnetic spacers 110 are a segregant for physically separating the granular columns 108 and therefore magnetically decoupling the granular columns 108 from each other. Various embodiments may include the recording layer 107 in various positions within the HAMR media stack 100. Furthermore, various embodiments may include more than one of the recording layer 107.

Some non-limiting examples of the materials in the granular columns 108 include, for example, FePt, FeXPt alloy, FeXPd alloy, $Co_3Pt$, CoXPt alloy, CoX/Pt multilayer, CoXPd alloy, CoX/Pt multilayer, 3D transition metal-rare earth alloys such as CoSm alloys, and/or other materials. Some non-limiting examples of the materials in the non-magnetic spacers 110 include, for example, oxides (e.g. $SiO_2$, $TiO_2$, $B_2O_3$, etc.) or combinations of oxides.

In embodiments described herein, heat is locally applied (e.g. a thermal spot) to the HAMR media stack 100 during write operations in order to lower the magnetic anisotropy of a predetermined regions of the recording layer 107. A magnetic field is then applied in order to adjust the magnetization of the of the granular columns 108. While the granular columns are heated, a lower magnetic field is needed as compared to cooler granular columns.

In the illustrated embodiment of FIG. 1, a thermochromic layer 112 overlies the recording layer 107. The thermochromic layer 112 includes thermochromic materials that switch between a nominal optical absorbance at room temperature to a relatively high optical absorbance at certain transition temperatures. At the transition temperature of the material, the optical absorbance increases very rapidly. As such, the thermochromic layer 112 helps to prevent thermal bloom (e.g. the rapid spread of heat) by confining higher temperatures to predetermined regions of the HAMR media stack 100 and reducing the lateral spread of heat. Outside of predetermined heated regions (e.g. a thermal spot), the thermochromic layer 112 maintains a low thermal conductivity and remains at temperatures below the magnetization switching temperature, for example room temperature (e.g. 15° C. to 22° C.).

In various embodiments, the thermochromic layer 112 may be about 1 nm to about 25 nm thick and may be deposited, for example with deposition methods used in the art (e.g. sputter deposition, etc.). As previously discussed, the thermochromic layer 112 maintains a low thermal conductivity in areas (e.g. outside of the thermal spot) at temperatures below the transition temperature or magnetization switching temperature. By utilizing thermochromic materials with a high magnetization switching temperature, the thermal spot in the HAMR media may be narrowed while enhancing the absorbance. Some non-limiting examples of materials exhibiting the foregoing properties include, for example:

| Material | Transition Temperature |
|---|---|
| $VO_2$ | ~60° C. |
| $Ag/O_2$ | 90° C. |
| $Ge_{20}Te_{80}$ | ~70° C. |
| $Ti_2O_3$ | ~230° C. |
| $NbO_2$ | 800° C. |
| $V_2O_5$ | 257° C. |
| $SmNiO_3$ | ~130° C. |
| $EuNiO_3$ | ~220° C. |
| $GdNiO_3$ | ~235° C. |
| $YiNiO_3$ | ~300° C. |

Transition temperatures are the approximate switching temperatures between the low absorbance state and the high absorbance state. As such, the optical absorbance increases rapidly with temperature. Therefore, the thermochromic layer 112 includes a first optical absorbance at a first temperature below the switching temperature, and a second optical absorbance at a second temperature above the switching temperature, wherein the second optical absorbance is higher than the first optical absorbance.

In various embodiments, a protective overcoat 114 overlies the thermochromic layer 112. The protective overcoat 114 is a protective layer including, for example, a carbon overcoat, diamond-like carbon, silicon nitride, or other protective material including the properties of corrosion protection and/or mechanical protection. In various embodiments, the protective overcoat 114 may also perform other functions and may be more than one layer.

In various embodiments, a lubricant layer 116 overlies the protective overcoat 114. The lubricant layer 116 may be, for example, a perfluoropolyether material or other lubricant material. It is understood that embodiments may include lubricant layers with various compositions. In some embodiments, the lubricant layer 116 may be omitted, included in the protective overcoat 114, or may be more than one layer.

It is understood that any of the aforementioned layers in the embodiments described above may be rearranged in any order. For example, the heat sink layer 106 may overlie the recording layer 107. In addition, any of the aforementioned layers in the embodiments described above may be in overlying contact (e.g. direct contact) with each other in various arrangements. For example, the heat sink layer 106 may be in overlying contact with the layer stack 104 or the substrate 102. Alternatively, the heat sink layer 106 may overlie the layer stack 104 or the substrate 102 with intervening layers in-between.

Figure 2:
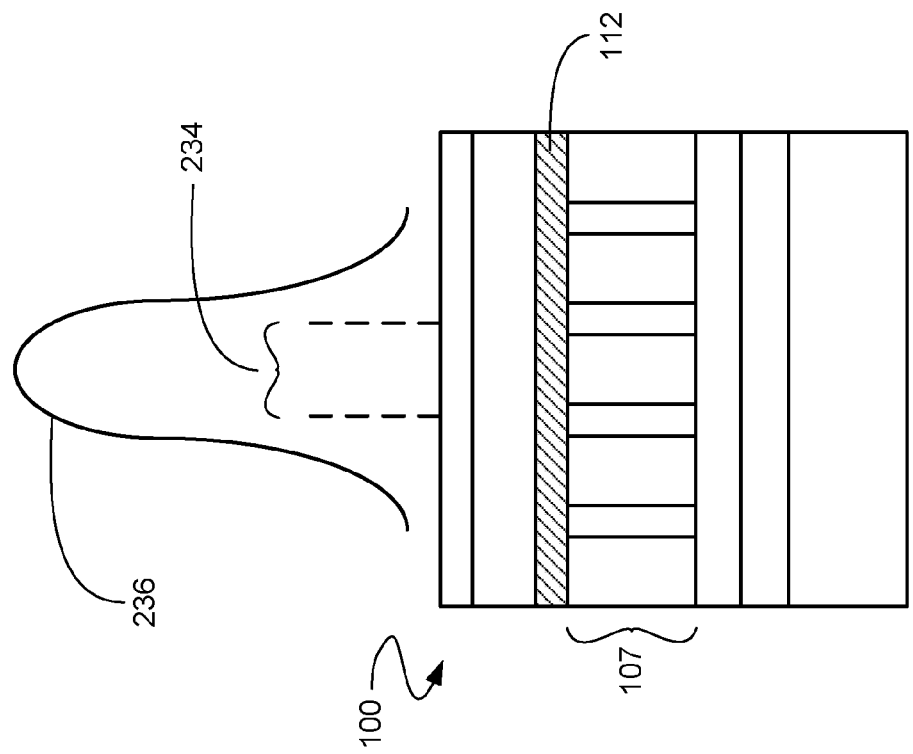
FIG. 2 illustrates a figurative illustration of temperature and thermal spot width of media with a thermochromic layer and media without a thermochromic layer according to one aspect of the present embodiments.
Figure 2:
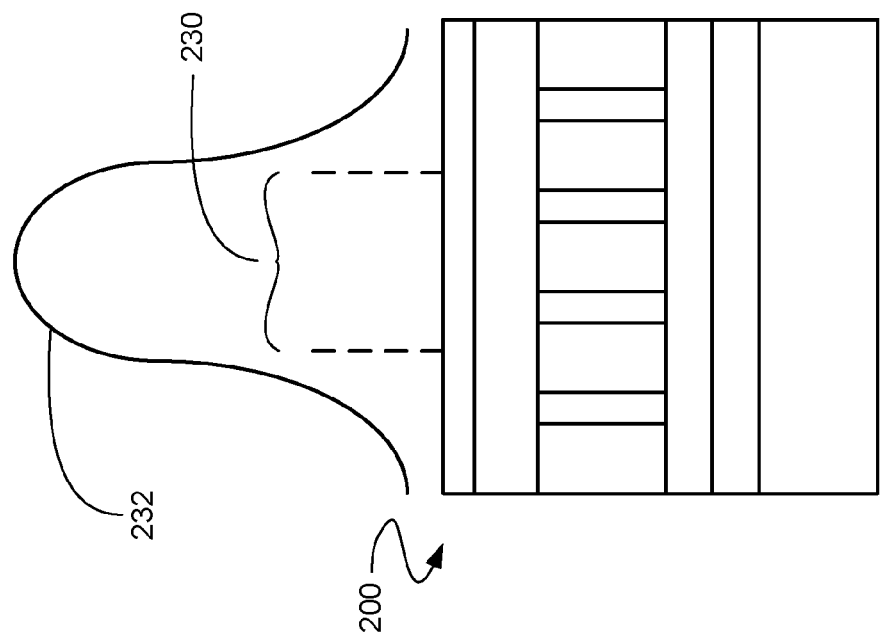

Referring now to FIG. 2, a figurative illustration of temperature and thermal spot width of media with a thermochromic layer and media without a thermochromic layer is shown according to one aspect of the present embodiments. As discussed above, a thermal spot may be used with HAMR media to locally heat a region in order to lower the magnetic anisotropy of the recording layer 107. As a result, magnetizations in the recording layer 107 are easier to switch and less writing power is needed.

As figuratively illustrated, a media stack 200 without the thermochromic layer 112 has a Gaussian thermal spot 232 with a width of 230. On the other hand, the HAMR media stack 100 with the thermochromic layer 107 has a Gaussian thermal spot 236 with a width of 234, also figuratively illustrated. As can be seen, the Gaussian thermal spot 236 of the HAMR media stack 100 is much narrower than the Gaussian thermal spot 232 of the media stack 200. The narrower Gaussian thermal spot 236 of the HAMR media is a result of the thermochromic layer 112. Therefore, the thermochromic layer 112 helps to confine the thermal region to a narrower predetermined location on the HAMR media stack 100, thereby preventing thermal bloom.

Figure 3:
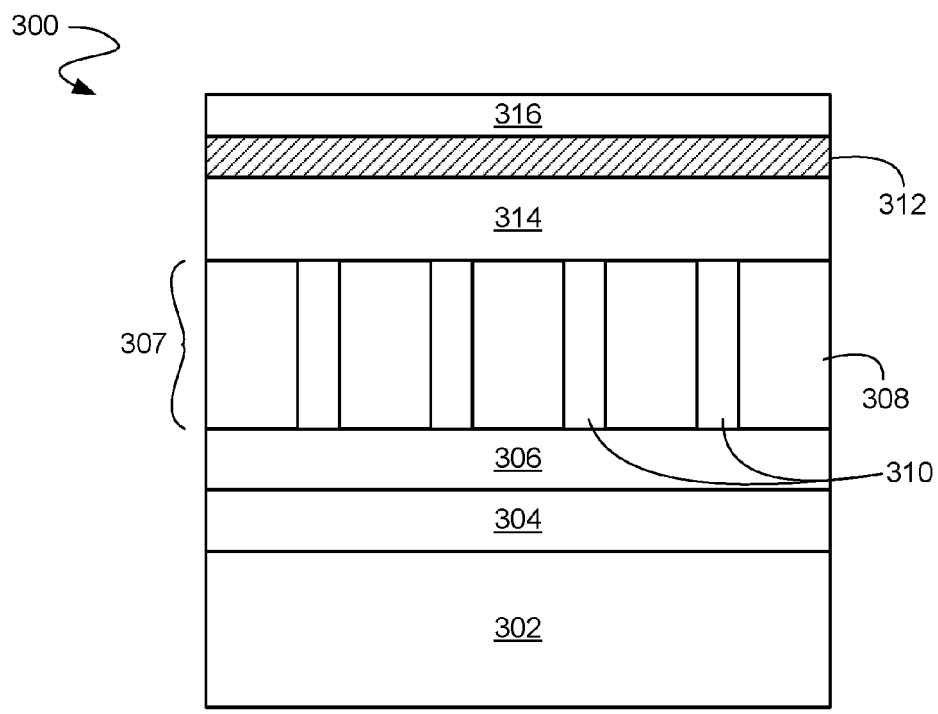
FIG. 3 illustrates a HAMR media stack including a thermochromic layer above an overcoat layer according to one aspect of the present embodiments.

Referring now to FIG. 3, a HAMR media stack 300 including a thermochromic layer above an overcoat layer is shown according to one aspect of the present embodiments. A substrate 302 is provided. A layer stack 304, a heat sink layer 306, and a recording layer 307 all overlie the substrate 302. The recording layer 307 includes granular columns 308 that are separated by non-magnetic spacers 310. An overcoat layer 314 overlies the recording layer 307, and a lubricant layer 316 overlies the overcoat layer 314. In the present embodiment, a thermochromic layer 312 is between the overcoat layer 314 and the lubricant layer 316. In various embodiments the thermochromic layer 312 may be in overlying contact with the overcoat layer 314, and/or the lubricant layer 316 may be in overlying contact with the thermochromic layer 312. As such, the overcoat layer 314 is a protective layer under the thermochromic layer 312.

Figure 4:
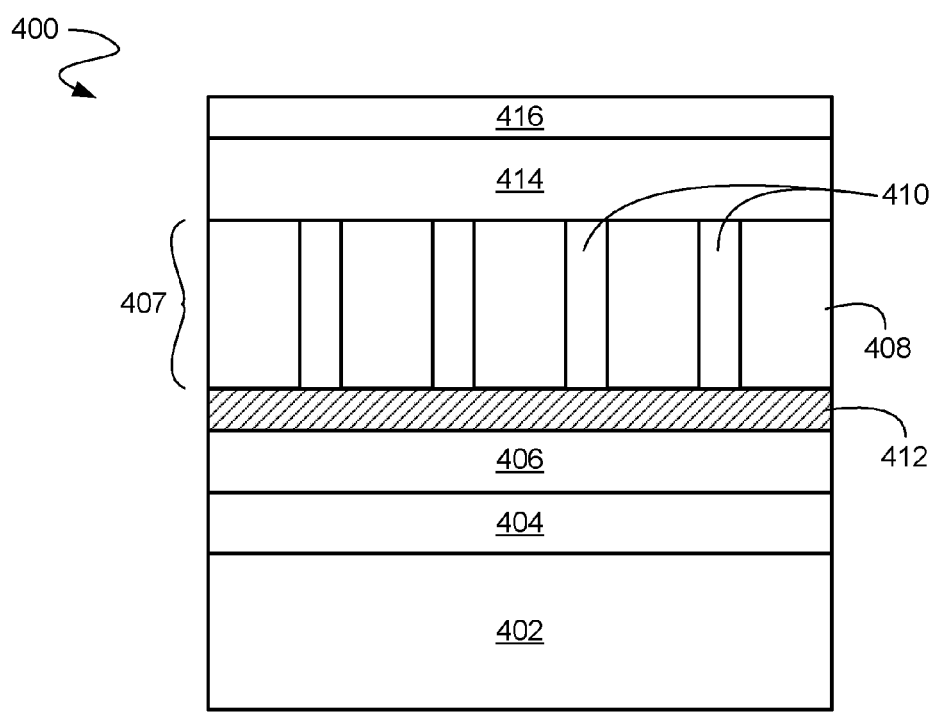
FIGS. 4 illustrates a HAMR media stack including a thermochromic layer under a granular magnetic recording layer according to one aspect of the present embodiments.

Referring now to FIG. 4 a HAMR media stack 400 including a thermochromic layer under a granular magnetic recording layer is shown according to one aspect of the present embodiments. A substrate 402 is provided. A layer stack 404, a heat sink layer 406, and a recording layer 407 all overlie the substrate 402. The recording layer 407 includes granular columns 408 that are separated by non-magnetic spacers 410. An overcoat layer 414 overlies the recording layer 407, and a lubricant layer 416 overlies the overcoat layer 414. In the present embodiment, a thermochromic layer 412 is between the heat sink layer 406 and the recording layer 407. In various embodiments the thermochromic layer 412 may be in overlying contact with the heat sink layer 406, and/or the recording layer 407 may be in overlying contact with the thermochromic layer 412.

Figure 5:
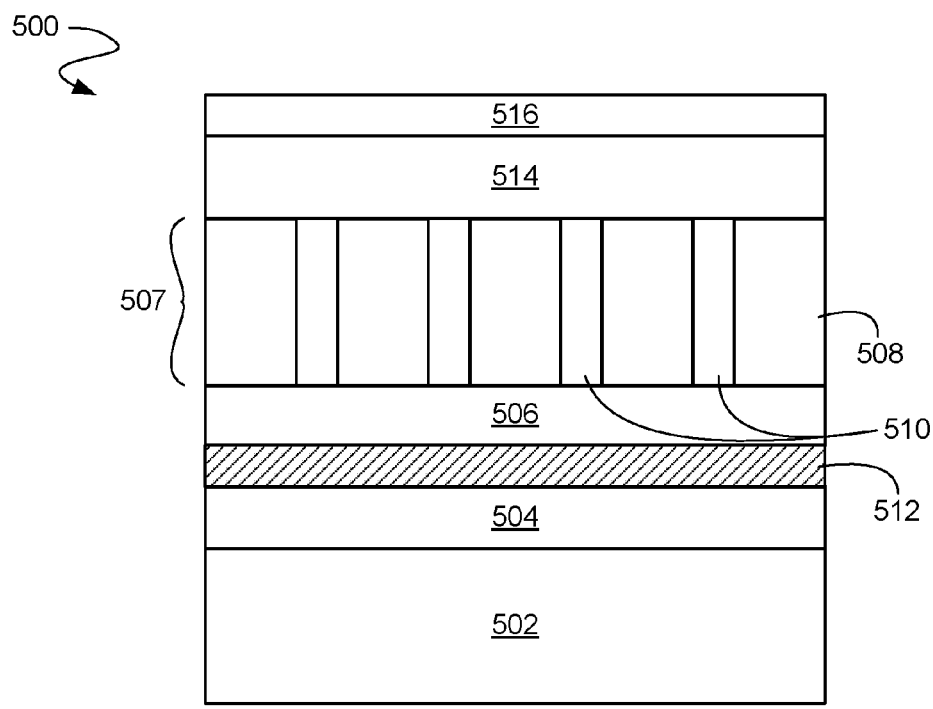
FIG. 5 illustrates a HAMR media stack including a thermochromic layer above a heat sink according to one aspect of the present embodiments.

Referring now to FIG. 5, a HAMR media stack 500 including a thermochromic layer above a heat sink is shown according to one aspect of the present embodiments. A substrate 502 is provided. A layer stack 504, a heat sink layer 506, and a recording layer 507 all overlie the substrate 502. The recording layer 507 includes granular columns 508 that are separated by non-magnetic spacers 510. An overcoat layer 514 overlies the recording layer 507, and a lubricant layer 516 overlies the overcoat layer 514. In the present embodiment, a thermochromic layer 512 is between the heat sink layer 506 and the layer stack 504. In various embodiments the thermochromic layer 512 may be in overlying contact with the layer stack 504, and/or the heat sink layer 506 may be in overlying contact with the thermochromic layer 512.

Figure 6:
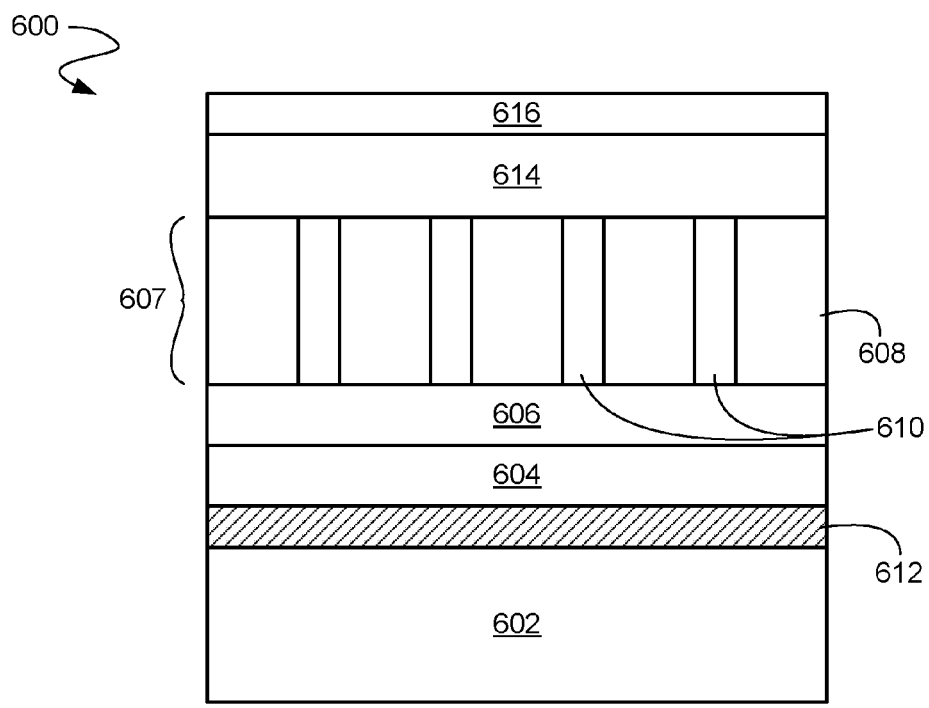
FIG. 6 illustrates a HAMR media stack including a thermochromic layer below a heat sink layer according to one aspect of the present embodiments.

Referring now to FIG. 6, a HAMR media stack 600 including a thermochromic layer below a heat sink layer is shown according to one aspect of the present embodiments. A substrate 602 is provided. A layer stack 604, a heat sink layer 606, and a recording layer 607 all overlie the substrate 602. The recording layer 607 includes granular columns 608 that are separated by non-magnetic spacers 610. An overcoat layer 614 overlies the recording layer 607, and a lubricant layer 616 overlies the overcoat layer 614. In the present embodiment, a thermochromic layer 612 is between the layer stack 604 and the substrate 602. In various embodiments the thermochromic layer 612 may be in overlying contact with the substrate 602, and/or the layer stack 604 may be in overlying contact with the thermochromic layer 612.

Figure 7:
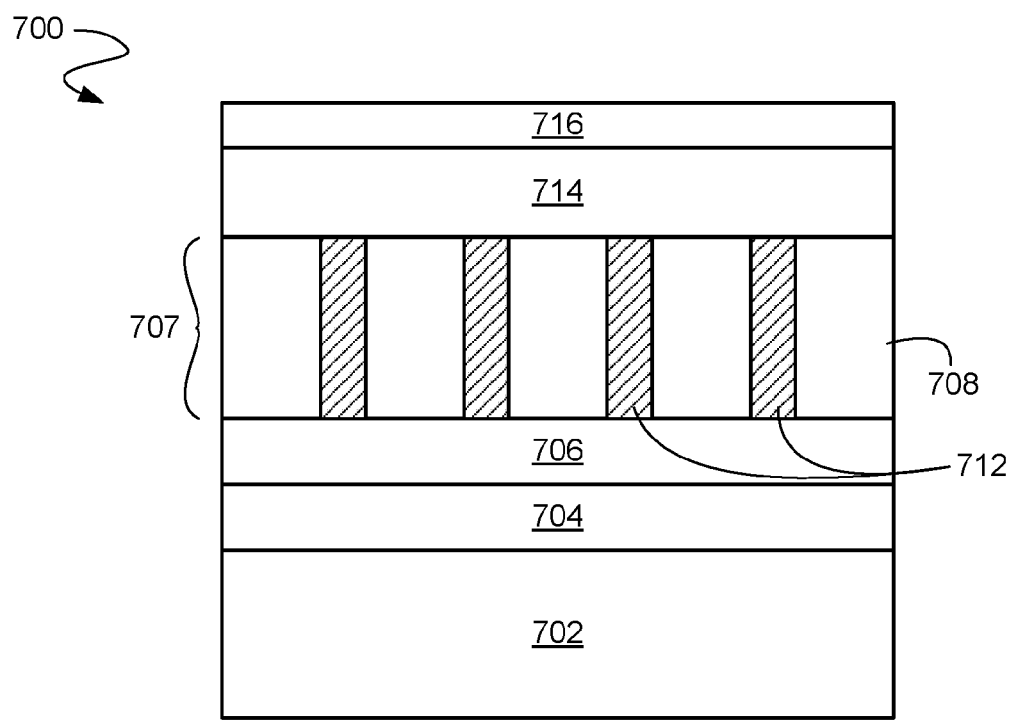
FIG. 7 illustrates a HAMR media stack including a thermochromic layer as a segregant within a granular magnetic recording layer according to one aspect of the present embodiments.

Referring now to FIG. 7, a HAMR media stack 700 including a thermochromic layer as a segregant within a granular magnetic recording layer is shown according to one aspect of the present embodiments. A substrate 702 is provided. A layer stack 704, a heat sink layer 706, and a recording layer 707 all overlie the substrate 702. An overcoat layer 714 overlies the recording layer 707, and a lubricant layer 716 overlies the overcoat layer 714. In the present embodiment, the recording layer 707 includes granular columns 708 that are separated by a thermochromic layer 712. In addition to the functionality described above, the thermochromic layer 712 in the present embodiment functions as a segregant, thereby separating the granular columns 708 as described above in other embodiments and functions as non-magnetic spacers that were described above in FIGS. 1-6. Therefore, it is understood that the recording layer 707 includes the granular columns 708 and the thermochromic layer 712, which are each within the same horizontal plane, and the horizontal plane is with respect to the other layers of the HAMR media stack 700, for example the heat sink layer 706. In various embodiments the thermochromic layer 712 may be in overlying contact with the heat sink layer 706, and/or the overcoat layer 714 may be in overlying contact with the thermochromic layer 712.

Figure 8:
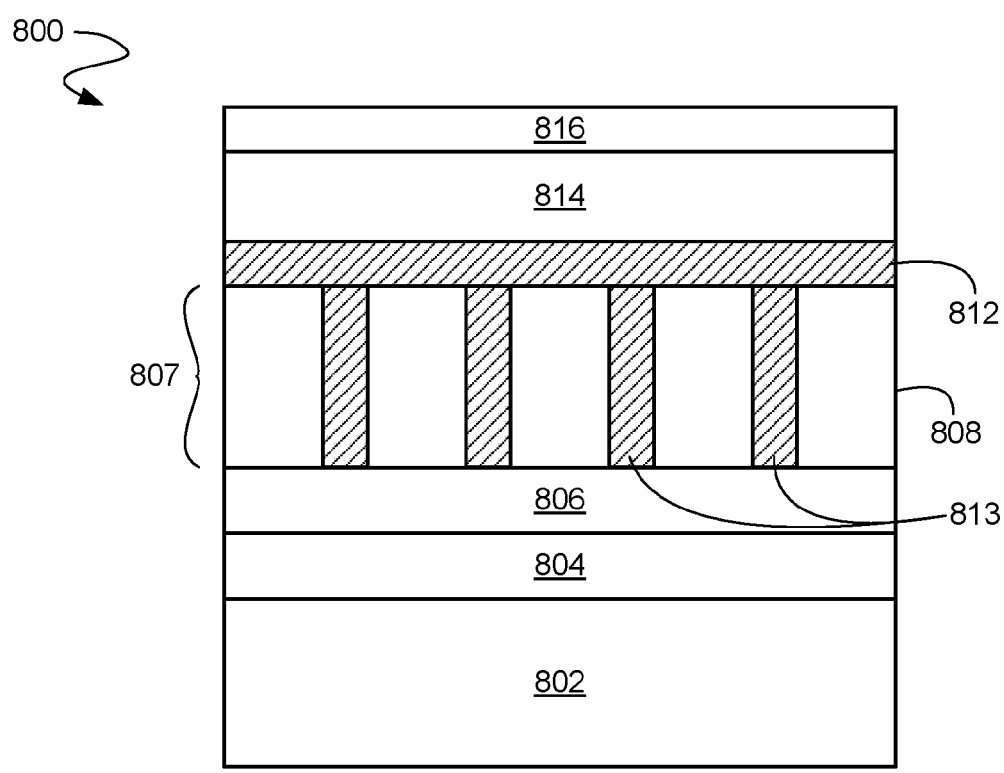
FIG. 8 illustrates a HAMR media stack including a thermochromic layer as a segregant within a granular magnetic recording layer and another thermochromic layer over the granular recording layer according to one aspect of the present embodiments.

Referring now to FIG. 8, a HAMR media stack 800 including a thermochromic layer as a segregant within a granular magnetic recording layer and another thermochromic layer over the granular recording layer is shown according to one aspect of the present embodiments. A substrate 802 is provided. A layer stack 804, a heat sink layer 806, and a recording layer 807 all overlie the substrate 802. An overcoat layer 814 overlies the recording layer 807, and a lubricant layer 816 overlies the overcoat layer 814. In the present embodiment, the recording layer 807 includes granular columns 808 that are separated by a thermochromic layer 813. In addition to the functionality described above, the thermochromic layer 813 in the present embodiment functions as a segregant, thereby separating the granular columns 808 as described above in other embodiments. In various embodiments the thermochromic layer 813 may be in overlying contact with the heat sink layer 806.

In addition, the present embodiment includes another thermochromic layer 812 located between the recording layer 807 and the overcoat layer 814. In various embodiments the thermochromic layer 812 may be in overlying contact with the recording layer 807, and/or the overcoat layer 814 may be in overlying contact with the thermochromic layer 812. As such, the thermochromic layer 813 within the recording layer 807 may include a first optical absorbance at a first temperature and a second optical absorbance at a second temperature, as described above. In addition, the thermochromic layer 812 overlying the recording layer 807 may include a third optical absorbance at a third temperature and a fourth optical absorbance at a fourth temperature. It is understood that the thermochromic layers (812, 813) may include the same material(s) or different material(s) which will affect their properties described above. It is further understood that the position of the thermochromic layer 812 is not limited to the present embodiment, and other embodiments may position the thermochromic layer 812 anywhere within the HAMR media stack 800.

Figure 9:
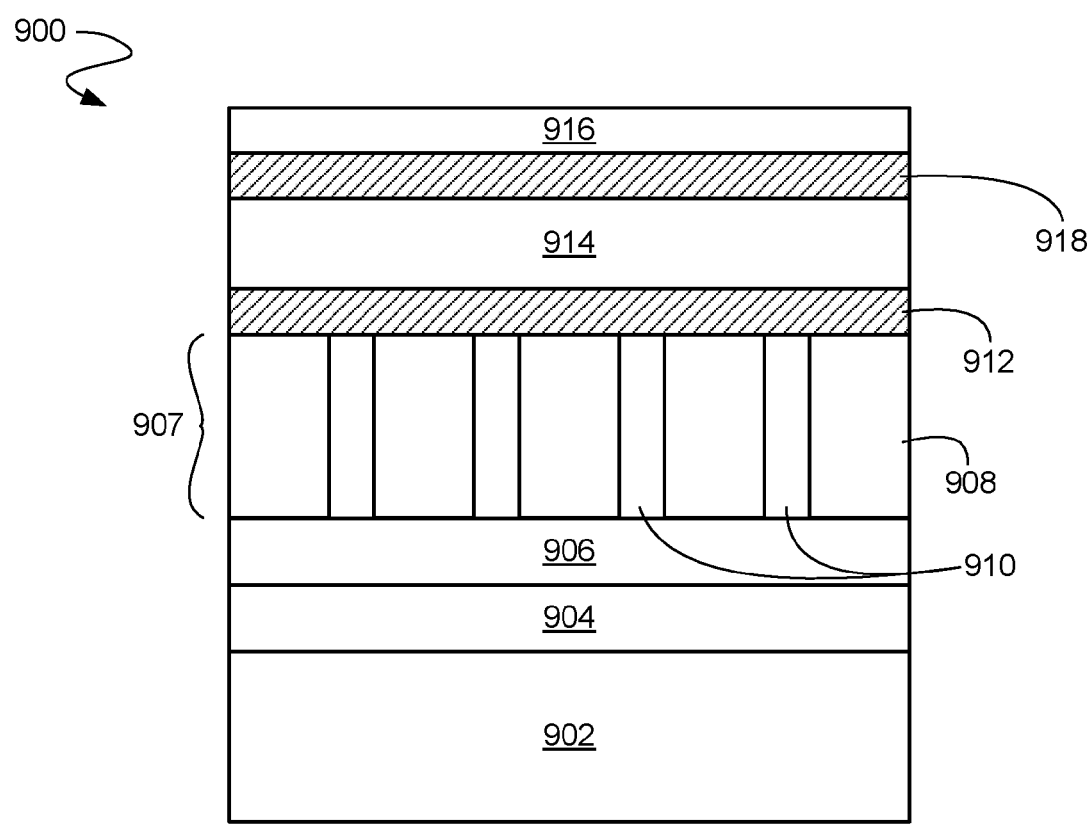
FIG. 9 illustrates a HAMR media stack including two thermochromic layers according to one aspect of the present embodiments.

Referring now to FIG. 9, a HAMR media stack 900 including two thermochromic layers is shown according to one aspect of the present embodiments. A substrate 902 is provided. A layer stack 904, a heat sink layer 906, and a recording layer 907 all overlie the substrate 902. The recording layer 907 includes granular columns 908 that are separated by non-magnetic spacers 910. An overcoat layer 914 overlies the recording layer 907, and a lubricant layer 916 overlies the overcoat layer 914. In the present embodiment, a thermochromic layer 912 is between the recording layer 907 and the overcoat layer 914. In various embodiments the thermochromic layer 912 may be in overlying contact with the recording layer 907, and/or the overcoat layer 914 may be in overlying contact with the thermochromic layer 912.

In addition, the present embodiment includes another thermochromic layer 918 located between the overcoat layer 914 and the lubricant layer 916. In various embodiments the thermochromic layer 918 may be in overlying contact with the overcoat layer 914, and/or the lubricant layer 916 may be in overlying contact with the thermochromic layer 918. As such, the thermochromic layer 912 may include a first optical absorbance at a first temperature and a second optical absorbance at a second temperature, as described above. In addition, the thermochromic layer 918 overlying the overcoat layer 914 may include a third optical absorbance at a third temperature and a fourth optical absorbance at a fourth temperature.

In some embodiments, the thermochromic layer 912, closest to the recording layer 907, may have a higher transition temperature than the thermochromic layer 918, further away from the recording layer 907 and closer to the surface of the HAMR media stack 900. However, it is understood that the thermochromic layers (912, 918) may include the same material(s) or different material(s) which will affect their properties described above, and therefore further embodiments may include different combinations of switching temperatures for the thermochromic layers (912, 918) (e.g. same switching temperature, higher switching temperature on top, lower switching temperature on top, etc.). It is further understood that the positions of the thermochromic layers (912, 918) are not limited to the present embodiment, and other embodiments may position the thermochromic layers (912, 918) anywhere within the HAMR media stack 900, including in overlying contact with each other. Further embodiments may also include more than two thermochromic layers.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. An apparatus comprising:
a substrate;
a magnetic recording layer over the substrate;
a thermochromic layer over the magnetic recording layer, wherein
the thermochromic layer includes a first optical absorbance at a first temperature and a second optical absorbance at a second temperature,
the second optical absorbance is higher than the first optical absorbance, and
the second temperature is higher than the first temperature; and
an additional thermochromic layer over the substrate, wherein the additional thermochromic layer includes a third optical absorbance at a third temperature and a fourth optical absorbance at a fourth temperature.

2. The apparatus of claim 1, further comprising a protective layer over the thermochromic layer, wherein the protective layer includes diamond-like carbon.

3. The apparatus of claim 1, further comprising a heat sink layer under the magnetic recording layer.

4. The apparatus of claim 1, further comprising:
a protective layer under the thermochromic layer; and
a lubricant layer over the thermochromic layer.

5. The apparatus of claim 1, wherein the thermochromic layer is about 1 nm to about 25 nm thick.

6. The apparatus of claim 1, wherein the thermochromic layer includes $VO_2$; $Ag/O_2$; $Ge_{20}Te_{80}$; $Ti_2O_3$; $NbO_2$; $V_2O_5$; $SmNiO_3$; $EuNiO_3$; $GdNiO_3$; or $YiNiO_3$.

7. The apparatus of claim 1, wherein a transition temperature of the thermochromic layer for switching from the first optical absorbance to the second optical absorbance is less than about 300° C.

8. The apparatus of claim 1, wherein a transition temperature of the thermochromic layer for switching from the first optical absorbance to the second optical absorbance is greater than about 60° C.

9. An apparatus comprising:
a substrate;
a magnetic recording layer over the substrate;
a thermochromic layer over the substrate, wherein the thermochromic layer includes a first optical absorbance at a first temperature and a second optical absorbance at a second temperature; and
an additional thermochromic layer over the substrate, wherein the additional thermochromic layer includes a third optical absorbance at a third temperature and a fourth optical absorbance at a fourth temperature.

10. The apparatus of claim 9, further comprising a protective layer over the thermochromic layer.

11. The apparatus of claim 9, further comprising a heat sink layer over the substrate.

12. The apparatus of claim 9, wherein the magnetic recording layer comprises the thermochromic layer and a plurality of magnetic grains separated by the thermochromic layer.

13. The apparatus of claim 9, wherein the thermochromic layer includes $VO_2$; $Ag/O_2$; $Ge_{20}Te_{80}$; $Ti_2O_3$; $NbO_2$; $V_2O_5$; $SmNiO_3$; $EuNiO_3$; $GdNiO_3$; or $YiNiO_3$.

14. The apparatus of claim 9, wherein a transition temperature of the thermochromic layer for switching between the first optical absorbance and the second optical absorbance is 60° C. to 300° C.

15. An apparatus comprising:
a heat sink layer;
a magnetic recording layer over the heat sink layer;
a thermochromic layer over the heat sink layer, wherein the thermochromic layer includes a first optical absorbance at a first temperature and a second optical absorbance at a second temperature; and
an additional thermochromic layer over the heat sink layer, wherein the additional thermochromic layer includes a third optical absorbance at a third temperature and a fourth optical absorbance at a fourth temperature.

16. The apparatus of claim 15, wherein the second optical absorbance is higher than the first optical absorbance.

17. The apparatus of claim 15, wherein the second temperature is higher than the first temperature.

18. The apparatus of claim 15, wherein the magnetic recording layer and the thermochromic layer are in a same horizontal plane.

19. The apparatus of claim 15, wherein the first temperature is 15° C. to 22° C.

* * * * *